United States Patent [19]
Freudenschuss

[11] 3,944,348
[45] Mar. 16, 1976

[54] METHOD OF AND MEANS FOR CHECKING THE CORRELATION OF TWO DATA CARRIERS

[75] Inventor: Otto Freudenschuss, Vienna, Austria

[73] Assignees: Karl Vockenhuber; Raimund Hauser, both of Vienna, Austria

[22] Filed: Nov. 8, 1973

[21] Appl. No.: 414,071

[30] Foreign Application Priority Data
Nov. 14, 1972  Austria ............................... 9659/72

[52] U.S. Cl. ......................... 352/5; 352/12; 352/92; 352/169; 360/80
[51] Int. Cl.² ......................................... G03B 31/00
[58] Field of Search ............... 352/5, 12, 17, 20, 23, 352/24; 360/80

[56] References Cited
UNITED STATES PATENTS

| | | | |
|---|---|---|---|
| 2,693,127 | 11/1954 | Ortman | 360/80 X |
| 3,498,702 | 3/1970 | Meninger et al. | 352/12 |
| 3,563,641 | 2/1971 | Ryder | 352/17 |
| 3,690,746 | 9/1972 | Kotler et al. | 352/12 |
| 3,743,392 | 7/1973 | Numata et al. | 352/17 |

FOREIGN PATENTS OR APPLICATIONS

| | | | |
|---|---|---|---|
| 1,368,295 | 6/1964 | France | 352/12 |

*Primary Examiner*—Fred L. Braun
*Attorney, Agent, or Firm*—Ernest G. Montague; Karl F. Ross; Herbert Dubno

[57] ABSTRACT

If a cine film is to be projected to the accompaniment of a sound track on a separate tape it is necessary to check that the film and the sound track are correctly coordinated. This is ensured by reading a code mark from the sound track and using it to slow or stop the motion of the film. The point at which the film motion is slowed or stopped is used to evaluate the relative position of the film with respect to the sound track and thus check that correct coordination is present. This evaluation may take place visually or automatically. In the latter case the prolonged presence of a correlation marking on the film in a sensing position can be used to signal the existence of correlation whereas the absence of such marking may energize a warning lamp or deactivate the film drive.

10 Claims, 9 Drawing Figures

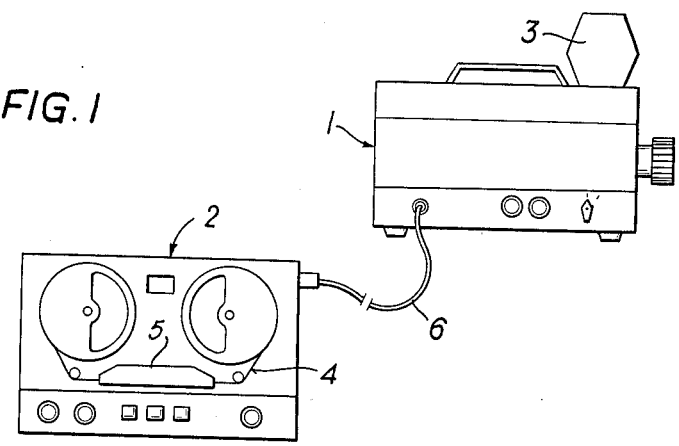
FIG. 1
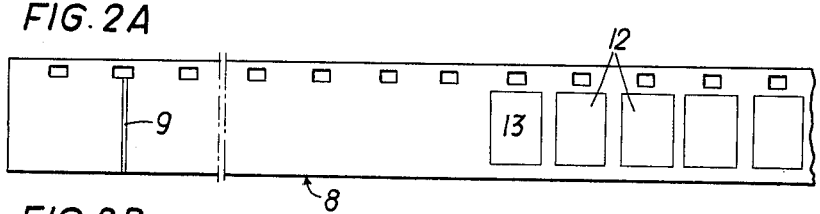
FIG. 2A
FIG. 2B
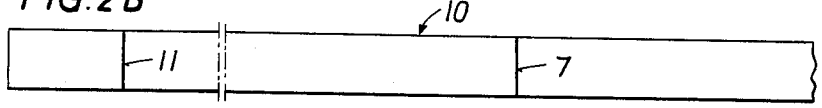
FIG. 2C
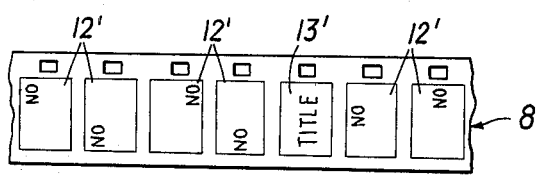
FIG. 3A
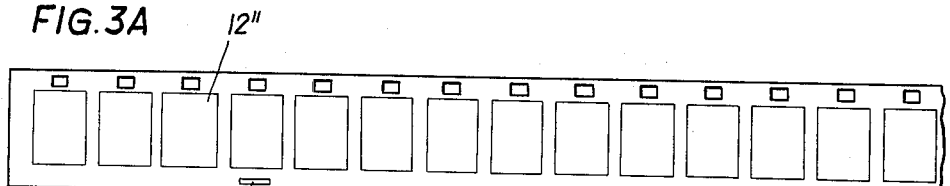
FIG. 3B
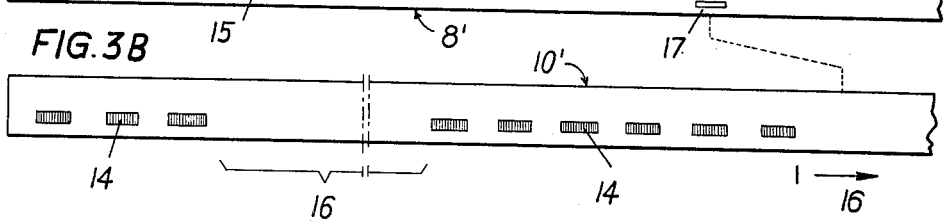

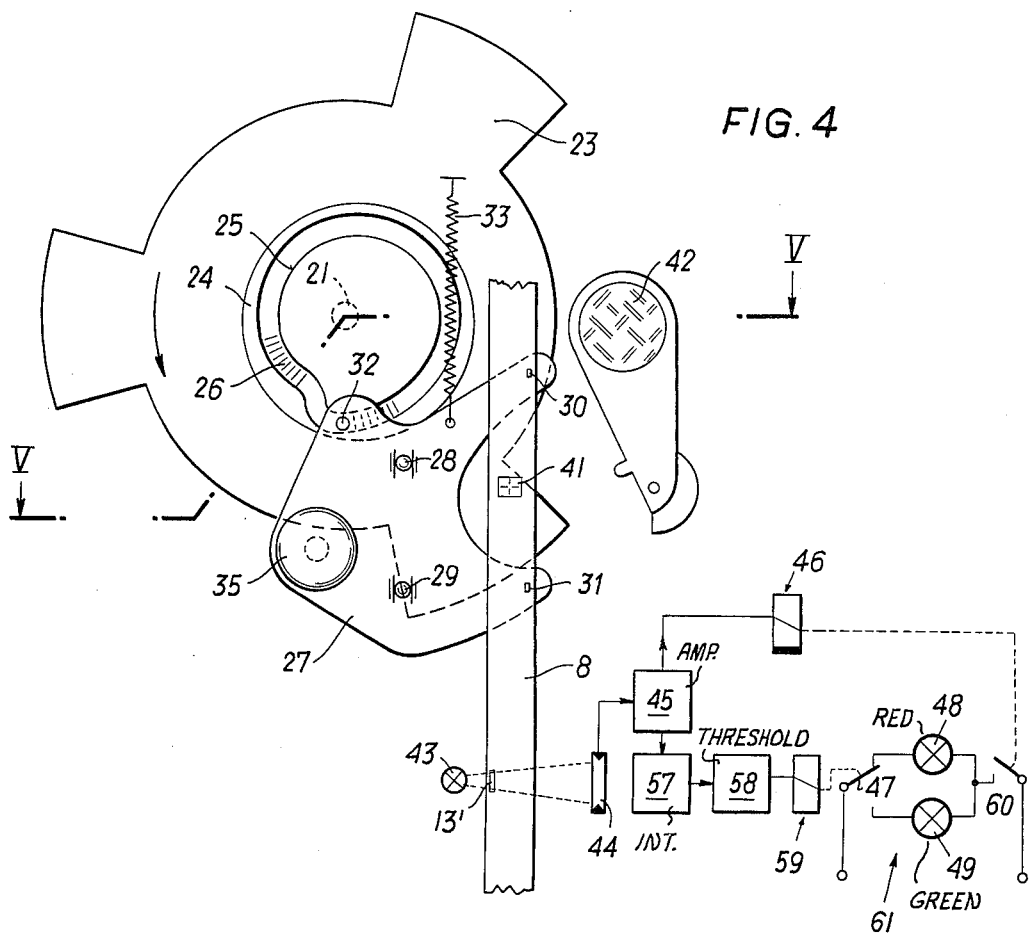

METHOD OF AND MEANS FOR CHECKING THE CORRELATION OF TWO DATA CARRIERS

FIELD OF THE INVENTION

My present invention relates to a method of and means for detecting the correct coordination of two strip-shaped data carriers more particularly cine film and recording tape, which are to be run simultaneously.

BACKGROUND OF THE INVENTION

Very unreliable means have hitherto been used for detecting the correct coordination of two separate data carriers, more particularly cinema films and the associated recording tape. In the simplest case, identifying markings were inscribed on the reel or cassette supporting each data carrier. Often the inscription on the sound carrier or the image carrier could not be read in the darkened room in which the performance was given so that mutually unrelated tapes and film were played back. Moreover, the inscription on the reel or on the cassette became very unclear and not readily readable in the course of time or became completely detached from the data carrier.

An improvement was obtained in recent times with a synchronizing method between film and sound, known as the "PIP" method, according to which the coordination between the two strips is indicated thereon by means of marks. To this end the marks on the sound carrier control the operating frequency of a transport claw for the drive of the image carrier whose driving speed may vary from zero or very low values in order to project a stationary image or to show a scene with "slow motion" effect, to normal projection speed. If a recording tape that was not correlated with the film was erroneously played back, the absence of correlation was noted sooner or later only by reference to the contrast between the sound and the film. In some circumstances it was possible that the wrong coordination went completely undetected, particularly in films with a minimum scene content and musical sound background. However, this could have a very detrimental effect especially if the sound background intended for the film was to have been particularly informative.

OBJECT OF THE INVENTION

The object of my invention is to provide a method of and means for reliably ascertaining, in an early phase of playback, the proper correlation of two data carriers such as a motion-picture film and a sound-recording tape which are to be run at the same time.

SUMMARY OF THE INVENTION

According to one aspect of my invention, a first data carrier (referred to hereinafter as the tape) is provided with a code mark detectable in an early phase of its run while a second data carrier (referred to hereinafter as the film) is provided with correlation and non-correlation markings which are detectable, also in an early phase of its run, with one mode of operation (e.g. at an abnormally low speed or on standstill) but nondetectable with another mode of operaton (e.g. at normal projection speed). The two data carriers are started substantially concurrently, with the film running at its normal speed so as to prevent detection of either of its aforementioned markings. Upon detection of the code mark on the tape, the film is switched to its alternate mode for detecting the markings thereon, the run of the data carriers being continued only if a correlation marking on the film is detected immediately after switching to this alternate mode. The non-correlation markings may be symbols occupying different positions on a series of successive image frames between which there is intercalated a frame with a correlation marking, preferably a title identifying the following scenes.

According to another aspect of my invention, detection of a code mark on the tape by reading means in a sound reproducer actuates a controller which switches the film drive to its alternate mode of operation, as by halting the intermittent advance of the film of an extended period; this facilitates ascertainment of the presence of a correlation marking at a predetermined location along the film path, either at the film gate through which an image frame is being projected (in case a message on that frame such as a title is used as the correlation marking) or at some other point where such marking can be detected by a photoelectric sensor. In the latter instance, the sensor may have an output circuit provided with timing means for generating a signal upon prolonged presence of the correlation marking at the sensing location, this signal being fed together with an output pulse from the reading circuit of the sound reproducer to a coincidence circuit designed to indicate lack of correlation between the tape and the film in the absence of such signal and in the presence of a reading pulse. The coincidence circuit may actuate a circuit breaker to deactivate the film drive (apart from the temporary halting of the film by the reading pulse from the sound reproducer) or may simply energize a warning lamp whenever correlation is absent.

BRIEF DESCRIPTION OF THE DRAWING

The above and other features of my invention will now be described in detail with reference to the accompanying drawing in which:

FIG. 1 illustrates diagrammatically a film projector whose film is to be checked for correlation with a tape providing the sound accompaniment to the projected film;

FIGS. 2A, 2B and 2C show markings on a section of the film strip and on a section of the sound tape to enable ascertainment of their correlation upon insertion thereof into the projector and the sound reproducer, respectively;

FIGS. 3A and 3B show sections of a film strip and a sound tape provided with respective control marks;

FIG. 4 diagrammatically illustrates a film-transporting traction claw and associated circuitry for detecting the presence or absence of a correlation marking on a film temporarily stopped by cessation of the claw movement in response to a code mark on an accompanying sound tape;

FIG. 5 is a section through the claw and associated cams of FIG. 4 taken on the line V—V thereof, also schematically illustrating a circuit for temporarily arresting the film when a code mark is read from the sound tape.

SPECIFIC DESCRIPTION

Figure 6:
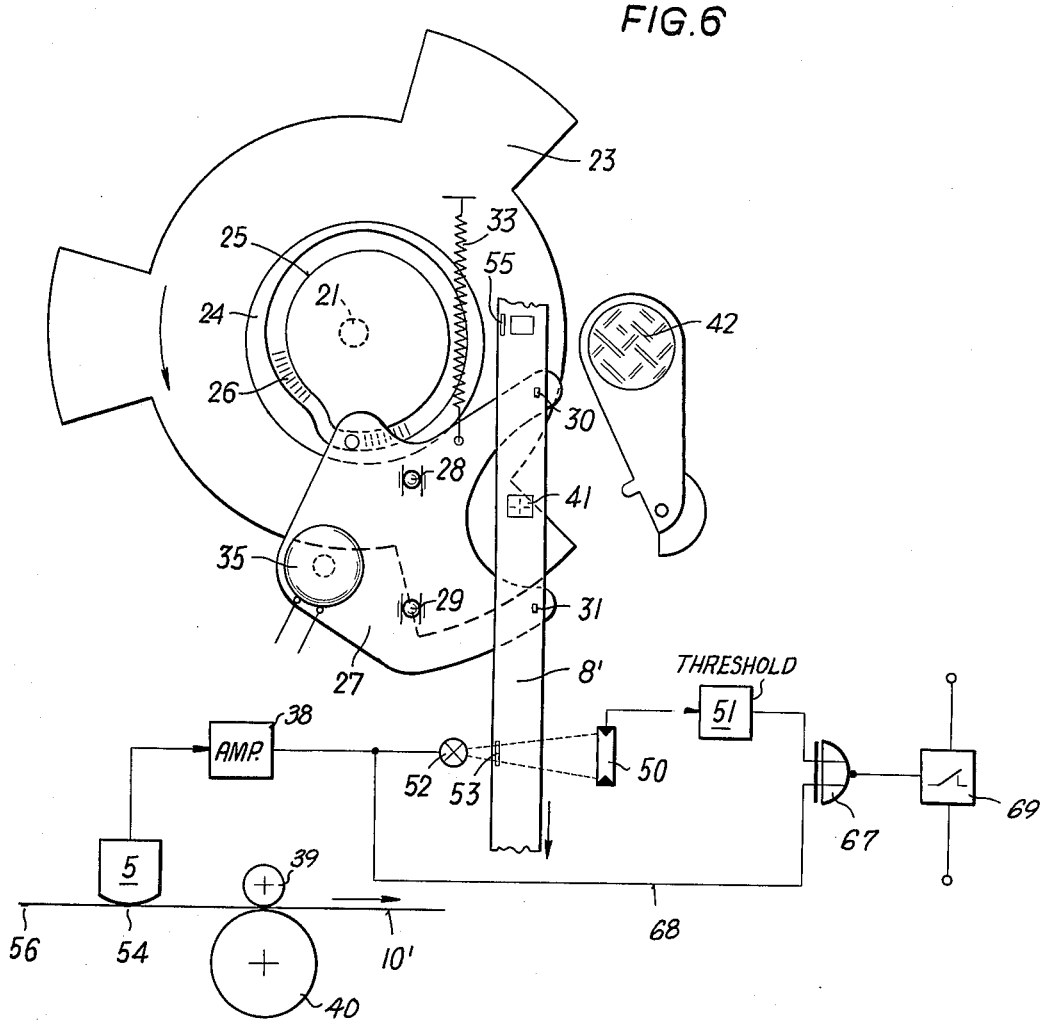
FIG. 6 shows diagrammatically a modification of the system of FIG. 4 determining correct correlation of the film strip and the sound tape.

In FIG. 1 I have diagrammatically shown a projector 1 for a motion-picture film which is supported in a cassette 3 and for which an acoustic background is produced by means of a sound tape 4 whose contents are reproduced by a tape recorder 2. A reading device 5 on the tape recorder 2 transmits a control signal via a connecting lead 6 to the film projector 1 as soon as a code mark on the recording tape 4 passes by the reading device 5.

A code mark 7 of this kind is shown by way of example in FIG. 2B. In order to detect the correct coordination of the two data carriers it is necessary that both carriers are started from an initial position of a sequence of suitably correlated positions corresponding to successive image frames on a film 8. To facilitate setting in this initial position, the film 8 shown in FIG. 2A is provided with a start mark 9 and the recording tape 10 shown in FIG. 2B is provided with a start mark 11.

The film 8 is then transported at a normal projection speed at which non-correlation and correlation markings thereon, i.e., frames 12 and 13, cannot be evaluated. In the simplest case such as that shown in FIG. 2A the non-correlation markings 12 comprise portions of light-transmitting leaders or scene images while the correlation markings 13 are each formed by a single film image which shows the film title when transluminated and projected. The simplest evaluation in this embodiment is performed by the operator of the apparatus. This is done by stopping the film drive as soon as a control signal is delivered via the lead 6 to the projector 1 when the code mark 7 reaches the reading device 5 of the tape recorder 2. If the film image which is then disposed in the image window displays the film title 13 it means that the two strips are correctly correlated with each other. If instead the leader or an image of the first or succeeding scenes is projected (that is to say an indicating mark 12) the operator will immediately know that the mark 7 has produced stoppage at the wrong time, and that the two strips are not coordinated or have been wrongly inserted. In all these eventualities there will be no synchronization when the two strips are played back.

FIG. 2C shows the manner in which the indicating marks may be applied to the film in order to enable the coordination to be unequivocally evaluated. The non-correlation frames 12' are provided with the symbol "NO" to indicate, upon projection, the non-coordination of the two data carriers when the mark 7 triggers the stoppage of the carrier 8. As may be seen from this Figure each of the symbols "NO" occupies a different position on the image 12' in the projection window. When the film is projected at a speed which is higher than an initially defined detection limit it is not possible to indicate the coordination because the inertia of the eye is not able to follow the "NO" marks which change their position suddenly. Evaluation relating to the coordination of the strips is possible only when the mark 7 produces a changeover in the transport speed of the film because the speed is then so reduced as to permit reading of the marks 12', 13'. The mark 13', which refers to correct coordination, may again in the simplest case represent the film title and it is particularly advantageous if the film speed at this point is zero so that the mark 12' or 13' which will be disposed in the image window, depending on the coordination of the two strips, will be projected when it is stationary.

In the embodiment of FIGS. 3A and 3B it is necessary for both data carriers 8' and 10' to be started from a coordinated position. To this end the transport speeds of the two data media need not be identical; it is merely essential that an indicating and/or control mark on the image carrier 8' and a correlated control mark on the sound carrier 10' simultaneously pass the corresponding evaluation stations. In the example illustrated in FIGS. 3A and 3B the sound carrier 10' is provided with control marks 14 which are associated with each image frame 12" and thus characterize the intermitten advance of the film 8' at the normal image frequency. If no control mark 13 is provided on the tape 10' it means that the film is to be projected when stationary. When the film 8' is correctly coordinated with the recording tape 10' a control mark 15 on the film can be used to provide a response from an evaluation device associated with the film, simultaneously with the absence of the first control mark 14. The time during which the affected image is to be projected, when stationary, corresponds to the time up to the moment when the sound tape, which continues to be transported, again aligns a mark 14 with the reading station of FIG. 1. This section of the tape is designated with the numeral 16 in FIG. 3B. Re-engagement of the film drive as controlled by the mark 14 is maintained until the next section 16 on the recording tape initiates a stationary projection, for example the film image registering with the control mark 17. This kind of encoding does not merely enable the coordination of the two data carriers to be recognized very soon after the beginning of the performance but also achieves synchronization over the entire length of the two strips. Synchronization is usually obtained by the control marks 14 acting upon a magnet for the claw control as for example in the known "PIP" system. It will be appreciated that the images themselves can be utilized in lieu of the control marks 15 and 17 in order to detect the coordination, as by projecting the film title when stationary. The code marks on the film could then be formed as described for example with reference to FIG. 2C. However, it is also feasible for the intervals 16 to be made substantially shorter and to be followed by one or possibly more control marks 14 in sequence. Such a sequence of control marks and intervals would result in a "slow motion" effect when the film 8' is projected and can of course also be utilized for evaluation with respect to the coordination or synchronization of the two strips.

FIGS. 4 and 5 show a claw spindle 21 of a projector, driven in counter-clockwise direction direction by a motor (not shown). The spindle 21 is provided with a boss 22 which supports a three-part shutter blade 23 and a cam disc 24. The disc 24 is provided with a radial cam 25 and an axial cam 26. The disc 24 confronts a claw frame 27 which is vertically slidably and pivotably supported on two balls 28 and 29. The claw frame 27 has two claw teeth 30, 31 which cooperate with perforations of the film 8 and transport it in accordance with the motion of the claw frame. The claw frame 27 is provided with a cam follower 32 which is pressed simultaneously against both cams 25, 26 of the disc 24 by springs 33 and 34. The cam follower 32 causes the claw frame 27 to be vertically reciprocated in accordance with the characteristics of the radial cam 25 while the axial cam 26 causes the claw frame to oscillate about bearings 28, 29 the claw teeth 30, 31 being either engaged with the perforations of the film 8 or disengaged therefrom. A cup magnet 35 which is energized by a pulse generator 36 shown in FIG. 5 is disposed opposite the claw frame 27 which is constructed of ferromagnetic material. A variable resistor 37 connected to the pulse generator 36 is part of a circuit of adjustable time constant. The resistor 37, which is normally so adjusted as to produce no pulse in the output of generator 36, can be controlled by the reading device 5 through an amplifier 38. The recording tape 10 is moved past the reading device 5 by a drive roller 39 and a pinch roller 40.

A heat filter 42 is provided which may be moved into the optical projection path, with the aid of control means schematically indicated at 62, together with the energization of the cup magnet 35 during prolonged projections of a film frame.

If the film 8 and the recording tape 10 are started at the coordinated marks 9, 11 as shown in FIGS. 2A and 2B, film 8 will be transported in known manner through the claw mechanism as long as the electromagnet 35 is not energized. Immediately before the actual stepping motion of the claw, the axial cam 26 will cause the claw teeth 30 and 31 to engage in respective perforations of the film. During the succeeding phase the claw frame is downwardly displaced by the radial cam 25, the claw teeth 30 and 31 transporting the film 8 through the film gate in the same sense. On completion of the transport stroke the axial cam 26 pivots the claw frame so that the claw teeth 30 and 31 are disengaged from the perforations of the film 8. The claw frame is subsequently returned by the radial cam 25 into the original starting position in readiness to commence a second cycle of movement.

When the code mark 7 on the recording tape 10 reaches the reading station 5, a signal is transmitted via the amplifier 38 to the resistor 37 to cause an adjustment thereof which is such that the generator 36 delivers a pulse to the cup magnet 35 to hold it energized and thus prevent the claw frame from engaging the film perforations. The film image which has just been aligned with an image window 41 of the film gate will then be projected while stationary. The title of the film 8 will be projected if the two data carriers 8, 10 are correctly coordinated with each other; otherwise the leader or a scene image 12 or a non-correlation marking 12' will be projected in accordance with FIG. 2C.

In FIG. 4 I have also shown a coincidence circuit for the automatic evaluation of coordination. For this purpose, the film strip 8 carries correlation markings 13' which are scanned by a reading device 43, 44 to supplement or replace visual strip coordination via the film image itself.

The reading device of the projection is a photoelectric sensor including a light source 43 to illuminate an edge track on the film 8 provided with the mark 13'. A photocell 44 is disposed on the opposite side of the film and works into an amplifier 45. The output of the amplifier 45 is connected to a slow-releasing relay 46 and, through an integrating RC element 57, to a threshold switch 58 which receives the output of the RC element 57 and controls a relay 59. A changeover contact 47 is operated by the relay 59 while the relay 46 controls an on-off contact 60 in a lamp circuit 61. Either a red lamp 48 or a green lamp 49 can be connected to a voltage supply in the lamp circuit 61. In its inoperative state the contact 47 connects the red lamp 48 to one terminal of the voltage supply so that it lights up, provided the connection to the voltage source is completed by the contact 60 in series with the other supply terminal.

Coordination of the two strips is evaluated by amplification in component 45 of the brief voltage pulse which is produced in the photocell 44 when the light-transmissive mark 13' passes between the light source 43 and the photocell 44. The resultant signal initially causes the red lamp 48 to be lit via the relay 46 which closes its contact 60. The output signal from the amplifier 45 is also supplied to the integrating RC element 57 during the period the contact 60 is closed. The delayed output signal from the RC element 57 passes to the threshold switch 58. Since the voltage pulse produced by the mark 13' is relatively short, owing to the film passing quickly between the light source 43 and the photocell 44, the charge in the capacitor of the RC element 57 is insufficient to operate the threshold switch 58 and the relay 59 will not be energized. The red lamp 48 remains switched on only until the delay winding in the relay 46 causes the relay contact 60 to open.

If the drive of the film 8 is stopped by the appearance of the code mark 7 on the recording tape and if the correlation marking 13' of the film 8 simultaneously is located between the light source 43 and the photocell 44 it means that the two strips are correctly coordinated with each other. The amplified output pulse produced by the photocell 44 now causes the red lamp 48 to be switched on again but this time it also causes the relay 59 to be energized. Since the duration of the pulse produces a sufficiently large charge in the capacitor of the RC element 57 as the film with the mark 13' is stopped between the light source 43 and the photocell 44, the threshold switch 58 triggers the relay 59 which thereupon reverses its armature 47 so that the green lamp 49 is lit instead of the red lamp 48. This indicates the correct coordination of the two strips. The green lamp is again switched off by the delay winding of the slow-releasing relay 60 after the film is moved on. After the voltage across the RC element 57 has decayed, the relay contact 47 is again connected to the red lamp 48 by virtue of the fact that the relay 59 is monostable and spring-biased to this armature position. A mode-selector switch may also be used in place of the lamps 49 and 48.

In FIG. 6 I have shown a modified coincidence circuit coacting with the film-transport mechanism described with reference to FIGS. 4 and 5. Whenever a control mark 54 or 56 on the recording tape 10' passes the associated reading device 5, a lamp 52 disposed adjacent the film path is lit. Behind the film 8' and the situated opposite lamp 52 is a photocell 50 whose output is connected via a threshold switch 51 to an "EX-NOR" (i.e., inverting Exclusive-OR) gate 67.

The second input of the gate 67 comprises a conductor 68 which is branched off the output of amplifier 38 feeding the lamp 52. The output of the "EX-NOR" gate 67 is connected to a switch 69 for interrupting the projector circuit.

If a correlation marking 53 on the film passes the associated reading device 50, 52 simultaneously with movement of a code mark 54 on the recording tape 10 past the reader 5, equivalent signals will be supplied to the gate 67 via the conductor 68 as well as via the photocell 50, illuminated by the lighting of the lamp 52, and the switch 69 will remain closed. This indicates the correct coordination of the strips. If the strips are not coordinated, the lamp 52 is lit only while no mark 53 on the film is aligned therewith. Owing to the low light transmissivity of the film-edge track in the absence of a mark 53, the voltage produced in the photocell 50 under these conditions is insufficient to energize effectively the circuit branch including the threshold switch 51 and to supply a signal to one of the inputs of the gate 67. However, since the other input of that gate is supplied with a control signal via the conductor 68 the switch 69 controlled by the gate 67 is opened and de-energizes the drive circuit for the projector motor. Coding the coordination of the two strips can be rendered very versatile by placing further code marks 55 on the film or applying code marks 56 to the recording tape.

Finally it should be mentioned that the detecting system for determining correlation between the two data carriers in the projector and in the tape recorder may also be associated with means for indicating faulty operation of coordinated strips if the strips are not started by the same mark, i.e. if they do not run in synchronism. Such a system has been disclosed in my copending application Ser. No. 411,063 filed Oct. 30, 1973.

I claim:

1. A method of checking the correlation of two independently driven data carriers to be run at the same time, comprising the steps of:
    providing a first data carrier with a code mark detectable in an early phase of its run;
    providing a second data carrier with correlation and non-correlation markings detectable in an early phase of its run with one mode of operation but nondetectable with another mode of operation;
    starting the run of both data carriers substantially concurrently, with said second data carrier in its other mode of operation preventing detection of either of said markings thereon;
    upon detecting said code mark on said first data carrier, switching said second data carrier to said one mode of operation for detecting the markings thereon; and
    continuing the run of said data carriers only upon detection of a correlation marking on said second data carrier immediately after switching to said one mode of operation.

2. A method as defined in claim 1 wherein said second data carrier is a motion-picture film, said one mode of operation being translumination of an image frame of said film held stationary for an extended period.

3. A method as defined in claim 2, comprising the further step of interposing a heat filter in the path of the transluminating light rays in said one mode of operation.

4. A method as defined in claim 2 wherein said non-correlation markings are provided in the form of symbols in different positions on a series of successive image frames to prevent reading of said symbols upon the running of said film at a normal projection speed representing said other mode of operation, a correlation marking being provided on an image frame intercalated in said series of frames.

5. A method as defined in claim 4 wherein said correlation marking is provided in the form of a title.

6. A system for checking the correlation of two independently driven data carriers to be run at the same time, comprising;
    first reading means for a first data carrier bearing a code mark;
    first drive means for moving said first data carrier past said first reading means;
    second reading means for a second data carrier bearing a correlation marking;
    second drive means for moving said second data carrier past said second reading means, said second drive means being switchable between a normal mode and an alternate mode of operation, said correlation marking being detectable by said second reading means only in said alternate mode of operation;
    control means connected to said first reading means for switching said second drive means from said normal mode to said alternate mode of operation upon detection of said code mark on said first data carrier during simultaneous operation of said first and second drive means; and
    evaluation means controlled by said second reading means for indicating a correlation between said first and second data carriers in response to detection of said correlation marking upon switchover to said alternate mode of operation.

7. A system as defined in claim 6 wherein said correlation marking registers with said second reading means only momentarily in said normal mode and for an extended period in said alternate mode of operation, said evaluation means comprising a signaling circuit connected to said second reading means and timing means in said signaling circuit for giving a correlation indication only upon prolonged registration of said correlation marking with said second reading means.

8. A system as defined in claim 7 wherein said first data carrier is a sound tape and said second data carrier is a motion-picture film, further comprising heat-filter means coupled with said control means for interposition between said film and an image-projecting light source during said extended period upon detection of said mark.

9. A system for checking the correlation of a sound-recording tape and a motion-picture film to be run at the same time, comprising:
    sound-reproducing means provided with first drive means for advancing a tape bearing a code mark;
    projection means provided with second drive means for advancing a film bearing a correlation marking;
    reading means in said sound-reproducing means for detecting said code mark;
    a light source in said projection means connected to said reading means for energization upon detection of said code mark;
    photoelectric sensing means juxtaposed with said light source in said projection means along the path of said film for detecting said correlation marking in the energized condition of said light source; and
    coincidence means connected to said sensing means and to said reading means for indicating lack of correlation between said tape and said film in the absence of an output signal from said sensing means upon detection of said code mark.

10. A system as defined in claim 9, further comprising a circuit breaker controlled by said coincidence means for deactivating said second drive means to indicate said lack of correlation.

* * * * *